United States Patent
Kim et al.

(10) Patent No.: US 12,528,954 B2
(45) Date of Patent: Jan. 20, 2026

(54) TRANSPARENT NICKEL COMPLEX COMPOUND INK COMPOSITION AND METHOD FOR PREPARING SAME

(71) Applicant: SOULBRAIN CO., LTD., Seongnam-si (KR)

(72) Inventors: Seok Joo Kim, Seongnam-si (KR); Myeong Jin Kim, Seongnam-si (KR)

(73) Assignee: SOULBRAIN CO., LTD., Seongnam-si (KR)

( * ) Notice: Subject to any disclaimer, the term of this patent is extended or adjusted under 35 U.S.C. 154(b) by 0 days.

(21) Appl. No.: 18/565,932

(22) PCT Filed: May 30, 2022

(86) PCT No.: PCT/KR2022/007650
§ 371 (c)(1),
(2) Date: Nov. 30, 2023

(87) PCT Pub. No.: WO2022/255750
PCT Pub. Date: Dec. 8, 2022

(65) Prior Publication Data
US 2024/0279495 A1    Aug. 22, 2024

(30) Foreign Application Priority Data
May 31, 2021    (KR) .................. 10-2021-0070171

(51) Int. Cl.
*C09D 11/52* (2014.01)
*C09D 11/037* (2014.01)
*H01B 1/00* (2006.01)

(52) U.S. Cl.
CPC ............ *C09D 11/037* (2013.01); *C09D 11/52* (2013.01); *H01B 1/00* (2013.01)

(58) Field of Classification Search
CPC ..... C09D 11/037; C09D 11/52; C09D 11/033; H01B 1/00
See application file for complete search history.

(56) References Cited

U.S. PATENT DOCUMENTS

2018/0134908 A1* 5/2018 Zhang .................... C09D 11/14
2019/0062582 A1* 2/2019 Keoshkerian ....... C23C 18/1692

FOREIGN PATENT DOCUMENTS

| JP | 2000-204495 A | 7/2000 | |
|---|---|---|---|
| JP | 2008-127657 A | 6/2008 | |
| JP | 2012-131894 A | 7/2012 | |
| JP | 2016166391 A | * 9/2016 | |
| KR | 10-2015-0118424 A | 10/2015 | |
| KR | 10-2020-0064350 A | 6/2020 | |
| WO | WO-2020111634 A1 | * 6/2020 | ............. C09D 11/03 |

* cited by examiner

*Primary Examiner* — Mark Kopec
*Assistant Examiner* — Jaison P Thomas
(74) *Attorney, Agent, or Firm* — Bridgeway IP Law Group, PLLC; Jihun Kim

(57) ABSTRACT

A transparent nickel complex ink composition and a method for preparing the same are described. Specifically, the transparent nickel complex ink composition comprises: a polar portion comprising nickel and a compound coordinated to the nickel; a solvent; and other additives. The nickel complex compound ink composition is transparent and particle-free, and has an absorbance (ABS) value of 1.0 or higher in a wavelength range of 600 nm to 650 nm.

11 Claims, 11 Drawing Sheets

TRANSPARENT NICKEL COMPLEX COMPOUND INK COMPOSITION AND METHOD FOR PREPARING SAME

TECHNICAL FIELD

The present invention relates to a transparent nickel complex ink composition and a method for preparing the same. More specifically, the nickel complex ink composition is transparent and particle-free, and has an absorbance (ABS) of 1.0 or higher in a wavelength range of 600 nm to 650 nm, and the maximum diameter of nickel particles in a thin film formed by applying the composition to a substrate is 150 nm or less. The composition may be used for forming MLCC internal electrodes, for electromagnetic wave shielding, for forming solar cell electrodes, or for forming display panel electrodes.

BACKGROUND ART

Nickel powder is used as a material for capacitors, which are electronic components that make up electronic circuits, and in particular, as a material for thick-film conductors that make up internal electrodes of multilayer ceramic components such as multilayer ceramic capacitors (MLCCs) or multilayer ceramic substrates.

Recently, as the capacity of multilayer ceramic capacitors has increased, the amount of internal electrode paste used to form a thick-film conductor of an internal electrode of a multilayer ceramic capacitor has also increased significantly. Therefore, as metal powders for internal electrode paste, inexpensive base metals such as nickel are mainly used instead of expensive noble metals.

Briefly, the fabrication of currently commercialized multilayer ceramic capacitors is performed through the following processes. First, an internal electrode paste obtained by mixing nickel powder, a binder resin such as ethyl cellulose, and an organic solvent such as terpineol is screen-printed on a dielectric green sheet. Next, the dielectric green sheets having the internal electrode paste printed thereon are laminated together so that the internal electrode paste and the dielectric green sheet overlap each other alternately, and pressed to obtain a laminate. Then, a shaped ceramic body can be obtained by cutting the obtained laminate to a predetermined size, removing the binder resin through heating (hereinafter referred to as "binder removal treatment"), followed by calcination at a high temperature of about 1,300° C. Finally, a multilayer ceramic capacitor can be obtained by mounting an external electrode on the obtained shaped ceramic body.

In this case, since a base metal such as nickel is used as metal powder in the internal electrode paste, the binder removal treatment of the laminate should be performed in an atmosphere with an extremely low oxygen concentration, such as an inert atmosphere, in order to prevent oxidation of the base metal.

Meanwhile, along with the miniaturization and increase in capacity of multilayer ceramic capacitors, thinning of both internal electrodes and dielectrics has recently been studied. In particular, in order to realize an internal electrode thin-film thickness of 400 nm or less, the particle diameter of nickel powder used in internal electrode paste also becomes fine. Accordingly, nickel powder with an average particle size of 0.5 μm or less is required, and thus nickel powder with an average particle size of 0.3 μm or less is mainly used.

In this regard, existing published technology proposes the use of a paste composition with 0 minimized particle size, such as an internal electrode paste containing functional particles with a particle size close to 50 nm, to minimize the thickness of an electrode formed using this paste. However, in the end, a problem arises in that the particle content exceeds 50 parts by weight based on 100 parts by weight of the total weight of the composition in order to ensure the stability of the composition. For this reason, there is a limitation in that it is impossible to reduce the thickness of the internal electrode to 400 nm or less.

Accordingly, the present inventors have prepared a transparent, particle-free conductive nickel complex ink composition for forming an internal electrode for a multilayer ceramic capacitor (MLCC), thereby completing the present invention. The transparent, nickel complex ink composition is transparent and particle-free, and has the advantage of having a lower metal content than existing pastes or inks, which makes it competitive, and an internal electrode formed using this ink composition may advantageously have a small thickness.

In this regard, Japanese Patent Application Publication No. 2008-127657 discloses a coating solution for forming a nickel layer, a method for producing a nickel layer, and a nickel layer.

DISCLOSURE

Technical Problem

Accordingly, the present invention has been made in order to solve the above-described problems, and an embodiment of the present invention is intended to provide a transparent nickel complex ink composition and a method for preparing the same.

However, technical problems to be achieved by the present invention are not limited to the technical problem mentioned above, and other technical problems not mentioned above may be clearly understood by those skilled in the art to which the present invention pertains from the following description.

Technical Solution

As a technical means for achieving the above-described technical problem, one aspect of the present invention provides a transparent nickel complex ink composition comprising:
a polar portion comprising nickel and a compound represented by Formula 1 below, coordinated to the nickel; a solvent; and other additives, wherein the nickel complex ink composition is transparent and particle-free, and has an absorbance (ABS) value of 1.0 or higher in a wavelength range of 600 nm to 650 nm:

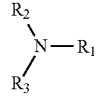

[Formula 1]

wherein $R_1$ to $R_3$ may be each independently hydrogen, linear or branched $C_5$-$C_{20}$ alkyl, linear or branched $C_5$-$C_{20}$ alkenyl, $C_5$-$C_{20}$ cycloalkyl, $C_6$-$C_{20}$ aryl unsubstituted or substituted with linear or branched $C_1$-$C_5$ alkyl or linear or branched $C_8$-$C_{18}$ alkyl, $C_6$-$C_{20}$ heteroaryl unsubstituted or substituted with linear or branched $C_1$-$C_5$ alkyl or linear or branched $C_8$-$C_{18}$ alkyl, or $C_5$-$C_{20}$ alkylcarbonyl, and at least one of $R_1$ to $R_3$ may be any one selected from the group consisting of $C_6$-$C_{20}$ aryl unsubstituted or substituted with linear or branched $C_1$-$C_5$alkyl or linear or branched $C_8$-$C_{18}$ alkyl, $C_6$-$C_{20}$ heteroaryl unsubstituted or substituted with linear or branched $C_1$-$C_5$alkyl or linear or branched $C_8$-$C_{18}$ alkyl, and linear or branched $C_5$-$C_{20}$ alkyl or $C_5$-$C_{20}$ alkenyl.

In Formula 1 above, $R_1$ to $R_3$ may be each independently hydrogen, linear or branched $C_8$-$C_{18}$ alkyl, linear or branched $C_8$-$C_{18}$ alkenyl, $C_8$-$C_{18}$ cycloalkyl, $C_8$-$C_{18}$ aryl unsubstituted or substituted with linear or branched $C_1$-$C_5$alkyl or linear or branched $C_8$-$C_{18}$ alkyl, $C_8$-$C_{18}$ heteroaryl unsubstituted or substituted with linear or branched $C_1$-$C_5$alkyl or linear or branched $C_8$-$C_{18}$ alkyl, linear or branched $C_8$-$C_{18}$ alkyl, or linear or branched $C_8$-$C_{18}$ alkenyl.

In Formula 1 above, $R_1$ and $R_2$ may be hydrogen, and $R_3$ may be $C_8$-$C_{18}$ aryl or heteroaryl substituted with linear or branched $C_1$-$C_5$alkyl or linear or branched $C_8$-$C_{18}$ alkyl, linear or branched $C_8$-$C_{18}$ alkyl, or linear or branched $C_8$-$C_{18}$ alkenyl.

The compound represented by Formula 1 may be 2-amino-1-methyl-1-propanol, n-hexylamine, hexylamine, cyclohexylamine, n-octylamine, octylamine, dodecylamine, oleylamine, benzylamine, 1-dimethylamino-2-propanol, 2-(diethylamino)ethanol, or diphenylamine.

The concentration of the polar portion may be 8 wt % to 72 wt % based on the total weight of the transparent nickel complex ink composition.

The solvent may comprise a material selected from the group consisting of terpineol, α-terpineol, dihydroterpineol, terpinyl acetate, dihydroterpinyl acetate, isobornyl acetate, isobornyl propionate, isobornyl isobutyrate, ethylene glycol, propylene glycol, butylene glycol, diethylene glycol, dipropylene glycol, dipropylene glycol monomethyl ether, ethylene glycol phenyl ether, propylene glycol phenyl ether, ethylene glycol monobutyl ether acetate, dipropylene glycol methyl ether acetate, ethanol, propanol, isopropyl alcohol, butanol, isooctyl alcohol, diacetone alcohol, 1,2-pentanediol, 1,5-pentanediol, 2-methyl-2,4-pentanediol, 3-methyl-1,5-pentanediol, and combinations thereof.

The other additives may comprise a material selected from the group consisting of a binder resin, a plasticizer, a stabilizer, a dispersant, a mold-release agent, a reducing agent, a surfactant, a wetting agent, a thixotropic agent, a leveling agent, and combinations thereof.

The binder resin may comprise a material selected from the group consisting of polyvinyl butyral, ethyl cellulose, polyvinyl pyrrolidone, acryl, polyvinyl acetal, polyvinyl alcohol, polyolefins, polyurethane, polystyrene, and combinations thereof.

The maximum diameter of nickel particles in a thin film formed by applying the transparent nickel complex ink composition to a substrate may be 150 nm or less.

The transparent nickel complex ink composition may be a transparent nickel complex ink composition for forming MLCC internal electrodes, for electromagnetic wave shielding, for forming solar cell electrodes, or for forming display panel electrodes.

Another aspect of the present invention provides a method for preparing a transparent nickel complex ink composition comprising steps of:
preparing a nickel complex by mixing a nickel precursor and a compound represented by Formula 1 below; mixing the nickel complex with a solvent; heating the nickel complex mixed with the solvent; and heating a binder resin together with the mixture in the heating step, wherein the nickel complex ink composition is transparent and particle-free, and has an absorbance (ABS) value of 1.0 or higher in a wavelength range of 600 nm to 650 nm:

[Formula 1]

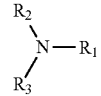

wherein $R_1$ to $R_3$ may be each independently hydrogen, linear or branched $C_5$-$C_{20}$ alkyl, linear or branched $C_5$-$C_{20}$ alkenyl, $C_5$-$C_{20}$ cycloalkyl, $C_6$-$C_{20}$ aryl unsubstituted or substituted with linear or branched $C_1$-$C_5$alkyl or linear or branched $C_8$-$C_{18}$ alkyl, $C_6$-$C_{20}$ heteroaryl unsubstituted or substituted with linear or branched $C_1$-$C_5$alkyl or linear or branched $C_8$-$C_{18}$ alkyl, or $C_5$-$C_{20}$ alkylcarbonyl, and at least one of $R_1$ to $R_3$ may be any one selected from the group consisting of $C_6$-$C_{20}$ aryl unsubstituted or substituted with linear or branched $C_1$-$C_5$alkyl or linear or branched. $C_8$-$C_{18}$ alkyl, $C_6$-$C_{20}$ heteroaryl unsubstituted or substituted with linear or branched $C_1$-$C_5$alkyl or linear or branched $C_8$-$C_{18}$ alkyl, and linear or branched $C_5$-$C_{20}$ alkyl or $C_5$-$C_{20}$ alkenyl.

The nickel complex ink composition is transparent and particle-free, and may have an absorbance (ABS) value of 1.0 or higher in a wavelength range of 600 nm to 650 nm.

The heating may be performed below 115° C.

Advantageous Effects

According to one aspect of the present invention, since the transparent nickel complex ink composition is transparent and particle-free, it may form a thinner coating than a conventional paste composition, and thus may be formed into a thin film.

In addition, the maximum diameter of nickel particles in a thin film formed by applying the nickel complex ink composition to a substrate is very small at about 150 nm or less, and thus the roughness of the nickel internal electrode is low. This low roughness may lead to the advantage of high adhesion or tightness in the process of laminating the MLCC internal electrode layers and the dielectric green sheets so as to overlap each other alternately and pressing the laminate. Thus, it is possible to increase the number of thin films in the same volume of the MLCC, thereby improving performance.

Effects of the present invention are not limited to the effects described above, and should be understood to include all effects that can be deduced from the configuration of the present invention described in the detailed description or claims of the present invention.

BEST MODE

Figure 1A:
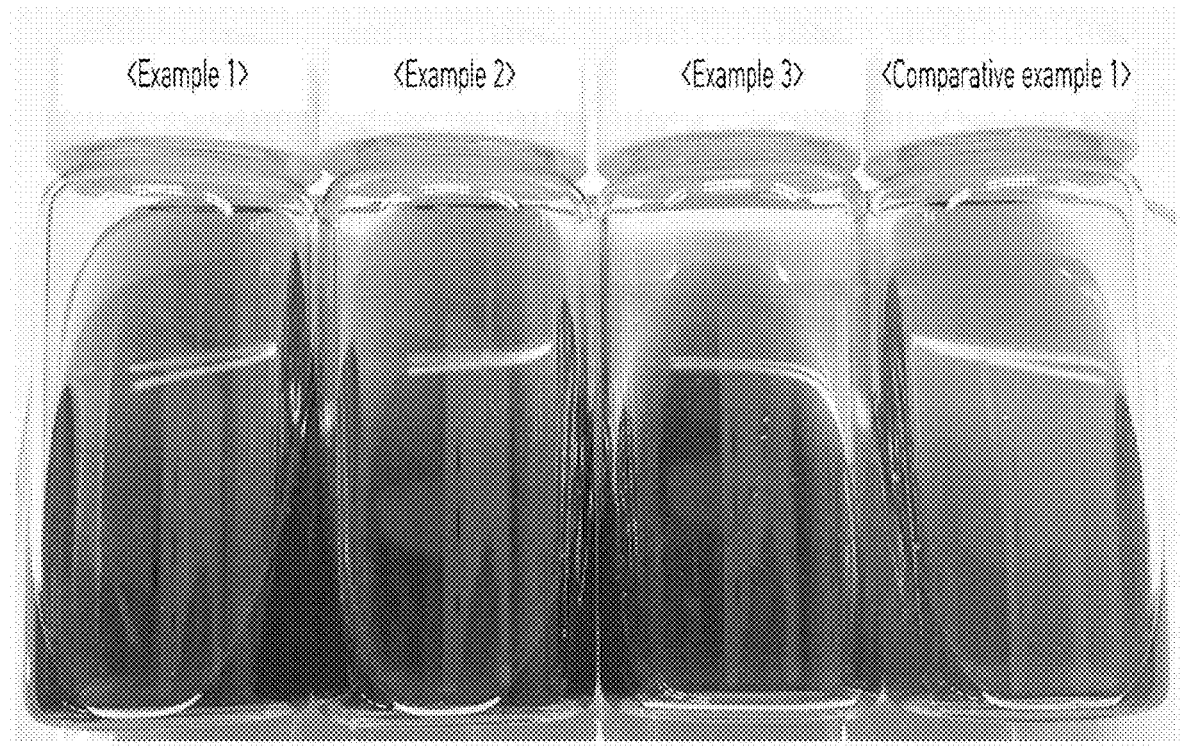
FIGS. 1A to 1B depict photographs showing transparent nickel complex ink compositions for forming MLCC internal electrodes, prepared according to examples of the present invention and comparative examples.

Hereinafter, the present invention will be described in more detail. However, the present invention may be embodied in various different forms, and the present invention is not limited to the embodiments described herein, and the scope of the present invention is defined only by the appended claims.

In addition, the terms used in the present invention are only used to describe specific embodiments and are not intended to limit the present invention. Singular expressions include plural expressions unless the context clearly dictates otherwise. Throughout the present specification, it is to be understood that when any part is referred to as "comprising" any component, it does not exclude other components, but may further include other components, unless otherwise specified.

First, the transparent nickel complex ink composition according to one embodiment of the present application may be used for nickel-containing electrodes of various electronic devices and semiconductor devices, or for electromagnetic interference (EMI) shielding. For example, it may be a transparent nickel complex ink composition for forming MLCC internal electrodes, for electromagnetic wave shielding, for forming solar cell electrodes, or for forming display panel electrodes. Preferably, it may be a nickel complex ink composition that is used for forming MLCC internal electrodes or electromagnetic wave shielding.

Multilayer Ceramic Capacitor (MLCC)

MLCC stands for the abbreviation for Multilayer Ceramic Capacitor.

MLCC is a capacitor with a fixed value in which a ceramic material acts as a dielectric. It is basically composed of two or more ceramic layers and metal layers that act as an electrode. The composition of the ceramic material determines the electrical behavior of the MLCC and the field of application thereof.

Recently, the global shortage of MLCCs has become a major issue due to increased demand for MLCCs in the smartphone, portable PC, and automobile industries. Electronic devices such as smartphones, computers, and LED TVs that we use every day contain more than 1,000 MLCCs. In electric vehicles, more than 10,000 MLCCs are needed for electronic control and automation systems. Many MLCCs are mounted in electronic devices because MLCCs distribute and control the amount of current flowing through circuits, remove noise, and prevent malfunction of electronic devices. Moreover, electronic devices with high performance, versatility, and high integration density require a large number of MLCCs with high capacity. According to this trend, miniaturization of MLCCs with high capacity is a major issue because space inside electronic devices is limited due to batteries and integrated circuits.

Important factors for the development of MLCCs with high volumetric efficiency and high capacity include: 1) use of dielectric materials with high dielectric constant; 2) laminating a larger number of internal electrode layers and dielectric layers, 3) increase of the area of overlapping internal electrode layers, and 4) decrease of the thickness of the internal electrode layers and dielectric layers. For high capacity and volumetric efficiency, next-generation MLCCs need to have a large number of laminated dielectric layers with a thickness of 1 μm. In particular, in the case of internal electrodes, it is required to laminate a large number of layers with a thickness of 400 nm or less.

Basic Principles of MLCC

The basic principle by which MLCC stores electricity is based on the polarization of the dielectric. In the absence of an external electric field, the electric dipoles inside the dielectric are distributed in a disordered manner and show the characteristics of an insulator. However, when a voltage is applied to the electrodes at both ends and an electric field is generated in the dielectric film, the dipoles are aligned in the direction of the magnetic field, and positive and negative charges are concentrated on both electrodes, respectively, making it possible to store electricity.

MLCC is a key passive component that has the function of temporarily charging the stored electricity, and has the characteristic of discharging the current always consistently by passing alternating current and blocking direct current. Passive components to be used in next-generation miniaturized and high-capacity electronic devices require MLCCs with higher capacitance.

MLCC is formed by alternately laminating many dielectric layers and internal electrodes in parallel. The internal electrode is connected to the external terminal for surface mounting. The capacity of MLCC is expressed as follows:

$$C = \varepsilon_r \varepsilon_o \frac{nS}{T}$$

wherein $\varepsilon_r$ represents relative permittivity, $\varepsilon_0$ represents vacuum permittivity, n represents the number of laminated internal electrodes, S represents the area of the internal electrode, and T represents the thickness of the internal electrodes. In order to realize a high-capacitance MLCC, the thickness and number of dielectric layers become major factors when determining the chip size. In other words, in order to increase the capacitance of the MLCC to realize high capacity, the surface area of the internal electrode should be maximized and the thickness of the dielectric layers and internal electrodes should be minimized. However, since it is impossible to increase the area of the device, due to the demand for further miniaturization of the device, it is necessary to obtain high capacitance by minimizing the thickness of internal electrodes and laminating internal electrodes and dielectric layers within the same volume.

Hereinafter, each aspect of the present invention that can realize thin film formation to minimize the thickness of MLCC internal electrodes will be described in detail.

A first aspect of the present invention provides a transparent nickel complex ink composition comprising:
a polar portion comprising nickel and a compound represented by Formula 1 below, coordinated to the nickel; a solvent; and other additives, wherein the nickel complex ink composition is transparent and particle-free, and has an absorbance (ABS) value of 1.0 or higher in a wavelength range of 600 nm to 650 nm:

[Formula 1]

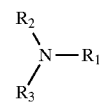

wherein $R_1$ to $R_3$ may be each independently hydrogen, linear or branched $C_5$-$C_{20}$ alkyl, linear or branched $C_5$-$C_{20}$ alkenyl, $C_5$-$C_{20}$ cycloalkyl, $C_6$-$C_{20}$ aryl unsubstituted or substituted with linear or branched $C_1$-$C_5$alkyl or linear or branched $C_8$-$C_{18}$ alkyl, $C_6$-$C_{20}$ heteroaryl unsubstituted or substituted with linear or branched $C_1$-$C_5$alkyl or linear or branched $C_8$-$C_{18}$ alkyl, or $C_5$-$C_{20}$ alkylcarbonyl, and at least one of $R_1$ to $R_3$ may be any one selected from the group consisting of $C_6$-$C_{20}$ aryl unsubstituted or substituted with linear or branched $C_1$-$C_5$alkyl or linear or branched $C_8$-$C_{18}$ alkyl, $C_6$-$C_{20}$ heteroaryl unsubstituted or substituted with linear or branched $C_1$-$C_5$alkyl or linear or branched $C_8$-$C_{18}$ alkyl, and linear or branched $C_5$-$C_{20}$ alkyl or $C_5$-$C_{20}$ alkenyl.

Hereinafter, the transparent nickel complex ink composition according to the first aspect of the present application and a thin film formed by applying the nickel complex ink composition to a substrate will be described in detail.

In one embodiment of the present application, the transparent nickel complex ink composition may be characterized by being transparent and particle-free. In other words, in the case of an internal electrode paste, which can be said to be a conventional nickel ink composition, functional nickel particles with a particle size close to 50 nm are contained in an amount of 50 parts by weight or more based on 100 parts by weight of the total weight of the composition in order to ensure the stability of the composition, and thus there is a limitation in that it is impossible to reduce the thickness of the internal electrode below 400 nm. However, in the case of the transparent nickel complex ink composition according to the present invention, which is characterized by being particle-free, the above problem does not occur, and thus it is possible to reduce the thickness of the internal electrode. Accordingly, the internal electrode fabricated using the transparent nickel complex ink composition may have a larger number of stacked internal electrode layers, and thus it is possible to achieve miniaturization and large capacity of a multilayer ceramic capacitor comprising the same.

In one embodiment of the present application, preferably, $R_1$ to $R_3$ in Formula 1 above may be each independently hydrogen, linear or branched $C_8$-$C_{18}$ alkyl, linear or branched $C_8$-$C_{18}$ alkenyl, $C_8$-$C_{18}$ cycloalkyl, $C_8$-$C_{18}$ aryl unsubstituted or substituted with linear or branched $C_1$-$C_5$alkyl or linear or branched $C_8$-$C_{18}$ alkyl, $C_8$-$C_{18}$ heteroaryl unsubstituted or substituted with linear or branched $C_1$-$C_5$alkyl or linear or branched $C_8$-$C_{18}$ alkyl, linear or branched $C_8$-$C_{18}$ alkyl, or linear or branched $C_8$-$C_{18}$ alkenyl. More preferably, $R_1$ and $R_2$ may be hydrogen, and $R_3$ may be $C_8$-$C_{18}$ aryl or heteroaryl substituted with linear or branched $C_1$-$C_5$alkyl or linear or branched $C_8$-$C_{18}$ alkyl, linear or branched $C_8$-$C_{18}$ alkyl, or linear or branched $C_8$-$C_{18}$ alkenyl.

In one embodiment of the present application, the compound represented by Formula 1 may be 2-amino-1-methyl-1-propanol, n-hexylamine, hexylamine, cyclohexylamine, n-octylamine, octylamine, dodecylamine, oleylamine, benzylamine, 1-dimethylamino-2-propanol, 2-(diethylamino) ethanol, or diphenylamine. That is, the lone pair of nitrogen contained in Formula 1 above may coordinates with nickel to form the polar portion.

In one embodiment of the present application, the concentration of the polar portion may be 8 wt % to 72 wt %, preferably 8 wt % to 64 wt %, more preferably 8 wt % to 56 wt %, based on the total weight of the nickel complex ink composition. If the concentration of the polar portion is less than 8 wt % based on the total weight of the transparent nickel complex ink composition, the solvent content is relatively high, and thus it may be difficult to form a uniform thin film in the process of forming a nickel internal electrode by applying the transparent nickel complex ink composition to a substrate. If the concentration of the polar portion is more than 72 wt %, the solvent content is relatively high, the polar part and the solvent may not be uniformly mixed together.

In one embodiment of the present application, the transparent nickel complex ink composition may comprise, as the solvent, a material selected from the group consisting of terpineol, α-terpineol, dihydroterpineol, terpinyl acetate, dihydroterpinyl acetate, isobornyl acetate, isobornyl propionate, isobornyl isobutyrate, ethylene glycol, propylene glycol, butylene glycol, diethylene glycol, dipropylene glycol, dipropylene glycol monomethyl ether, ethylene glycol phenyl ether, propylene glycol phenyl ether, ethylene glycol monobutyl ether acetate, dipropylene glycol methyl ether acetate, ethanol, propanol, isopropyl alcohol, butanol, isooctyl alcohol, diacetone alcohol, 1,2-pentanediol, 1,5-pentanediol, 2-methyl-2,4-pentanediol, 3-methyl-1,5-pentanediol, and combinations thereof. In other words, the solvent mixes well with the polar portion and has excellent wettability on the surface of a substrate, especially glass, and thus the transparent nickel complex ink composition comprising the same may form a layer with small thickness when applied to the substrate, and may also exhibit good coating uniformity. Furthermore, in the case of a solvent with low vapor pressure, such as dipropylene glycol monomethyl ether, the number of vaporized molecules is smaller than that of general solvents, and thus even if a small amount of heat is applied, the molecules in the liquid state may quickly change into gas state. If such a solvent is used together with a solvent having similar polarity, when the molecules in liquid state are vaporized, they may become gas together with the surrounding solvent molecules. Therefore, in the drying and sintering process after coating, the solvent is evaporated quickly while maintaining excellent wettability throughout the entire coating area, and thus the coating uniformity after the drying and sintering process may also be excellent. Therefore, when the ink composition comprising this solvent is applied to an internal electrode for a multilayer ceramic capacitor (MLCC), thinning of the internal electrode is achievable because it also has excellent wettability on the dielectric green sheet, which is the substrate of the internal electrode. Meanwhile, the content of the solvent may be 12 wt % to 86 wt % based on the total weight of the conductive nickel complex ink composition.

In one embodiment of the present application, the other additives may comprise a material selected from the group consisting of a binder resin, a plasticizer, a stabilizer, a dispersant, a mold-release agent, a reducing agent, a surfactant, a wetting agent, a thixotropic agent, a leveling agent, and combinations thereof.

The binder resin may comprise a material selected from the group consisting of polyvinyl butyral, ethyl cellulose, polyvinyl pyrrolidone, acryl, polyvinyl acetal, polyvinyl alcohol, polyolefins, polyurethane, polystyrene, and combinations thereof.

In one embodiment of the present application, examples of the wetting agents that may be used include polyols such as 1,2-hexanediol, 1,6-hexanediol, glycerin, polyethylene glycol, sorbitol, or trehalose, natural moisturizing factors (NMFs) such as amino acid, urea, lactate, or PCA-Na, and polymeric moisturizers such as hyaluronic acid, chondroitin sulfate, or hydrolyzed collagen.

In one embodiment of the present application, the leveling agent is an additive having a leveling effect, and may be a nitrogen-containing compound such as polyamine.

In one embodiment of the present application, the transparent nickel complex ink composition may have an absorbance (ABS) value of 1.0 or higher in a wavelength range of 600 nm to 650 nm. The reason why the nickel complex ink composition is observed to have a high absorbance (ABS) peak in a wavelength range of 600 nm to 650 nm may be that, when the lone pair of nitrogen contained in Formula 1 above coordinates with nickel to form the polar portion, an energy level difference between the d orbitals of nickel occurs, and as a result, the d-orbital electrons at the low energy level of nickel absorb light at a specific wavelength in a wavelength range of 600 nm to 650 nm and move to the d orbital at the high energy level. Meanwhile, the absorbance (ABS) value may mean a value when the concentration of the polar portion is 8 wt % to 72 wt % based on the total weight of the transparent nickel complex ink composition.

A second aspect of the present invention provides
a thin film formed by applying the transparent nickel complex ink composition to a substrate. In this case, although various types of substrates may be applied, the substrate may be, for example, glass. Preferably, the substrate may be a dielectric green sheet that serves as a substrate for an internal electrode of a multilayer ceramic capacitor (MLCC). Meanwhile, since the transparent nickel complex ink composition for the MLCC internal electrode comprises the solvent that mixes well with the polar portion and has low vapor pressure, it has excellent wettability on the above-described substrate. In addition, the solvent is evaporated quickly overall while maintaining excellent wettability throughout the entire coating area during the drying and sintering process after coating, and thus the coating uniformity after the drying and sintering process may also be excellent. Therefore, when the composition is applied to the substrate, a layer with a small thickness may be formed, and the coating uniformity may also be excellent.

Although detailed description of contents overlapping with those in the first aspect of the present invention has been omitted, the contents described with respect to the first aspect of the present invention may be applied equally to the second aspect even if the description thereof has been omitted in the second aspect.

In one embodiment of the present application, the maximum diameter of nickel particles in the thin film comprising the transparent nickel complex ink composition may be 150 nm or less. As the average diameter of the nickel particles is very small as described, the effect of reducing the roughness of the nickel internal electrode may be obtained. This may lead to the advantage of high adhesion or tightness in the process of laminating MLCC internal electrode layers and dielectric green sheets so as to overlap each other alternately and pressing the laminate. Thus, it is possible to increase the number of thin films in the same volume of the MLCC, thereby improving performance.

A third aspect of the present invention provides a method for preparing a transparent nickel complex ink composition comprising steps of:
preparing a nickel complex by mixing a nickel precursor and a compound represented by Formula 1 below;
mixing the nickel complex with a solvent; heating the nickel complex mixed with the solvent; and heating a binder resin together with the mixture in the heating step, wherein the nickel complex ink composition is transparent and particle-free, and has an absorbance (ABS)

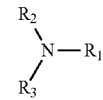

[Formula 1]

wherein $R_1$ to $R_3$ may be each independently hydrogen, linear or branched $C_5$-$C_{20}$ alkyl, linear or branched $C_5$-$C_{20}$ alkenyl, $C_5$-$C_{20}$ cycloalkyl, $C_6$-$C_{20}$ aryl unsubstituted or substituted with linear or branched $C_1$-$C_5$alkyl or linear or branched $C_8$-$C_{18}$ alkyl, $C_6$-$C_{20}$ heteroaryl unsubstituted or substituted with linear or branched $C_1$-$C_5$alkyl or linear or branched $C_8$-$C_{18}$ alkyl, or $C_5$-$C_{20}$ alkylcarbonyl, and at least one of $R_1$ to $R_3$ may be any one selected from the group consisting of $C_6$-$C_{20}$ aryl unsubstituted or substituted with linear or branched $C_1$-$C_5$alkyl or linear or branched $C_8$-$C_{18}$ alkyl, $C_6$-$C_{20}$ heteroaryl unsubstituted or substituted with linear or branched $C_1$-$C_5$alkyl or linear or branched $C_8$-$C_{18}$ alkyl, and linear or branched $C_5$-$C_{20}$ alkyl or $C_5$-$C_{20}$ alkenyl.

Although detailed description of contents overlapping with those in the first aspect of the present invention has been omitted, the contents described with respect to the first aspect of the present invention may be applied equally to the third aspect even if the description thereof has been omitted in the second aspect.

Hereinafter, each step of the method for preparing a transparent nickel complex ink composition according to the third aspect of the present application will be described in detail.

First, in one embodiment of the present application, the method for preparing a transparent nickel complex ink composition comprises a step of preparing a nickel complex by mixing a nickel precursor and the compound represented by Formula 1.

In one embodiment of the present application, the nickel precursor may comprise a material selected from the group consisting of nickel formate ($C_2H_2NiO_4$), nickel acetate (Ni($CH_3CO_2$)$_2$), nickel chloride ($NiCl_2$), nickel sulfate ($NiSO_4$), nickel acetylacetonate (Ni($C_5H_7O_2$)$_2$), nickel carbonate ($NiCO_3$), nickel cyclohexanebutyrate ([$C_6H_{11}(CH_2)_3CO_2$]$_2$Ni), nickel nitrate (Ni($NO_3$)$_2$), nickel oxalate ($NiC_2O_4$), nickel stearate (Ni($H_3C(CH_2)_{16}CO_2$)$_2$, nickel octanoate ([$CH_3(CH_2)_6CO_2$]$_2$Ni), and hydrates thereof. In this case, the carboxyl group contained in the nickel precursor may be removed by evaporation into $CO_2$ in a later subsequent removal step, and thus the final prepared composition may comprise the polar portion comprising nickel particles and the compound represented by Formula 1, coordinated to the nickel particles, and the solvent.

In one embodiment of the present application, preferably, $R_1$ to $R_3$ in Formula 1 above may be each independently hydrogen, linear or branched $C_8$-$C_{18}$ alkyl, linear or branched $C_8$-$C_{18}$ alkenyl, $C_8$-$C_{18}$ cycloalkyl, $C_8$-$C_{18}$ aryl unsubstituted or substituted with linear or branched $C_1$-$C_5$ alkyl or linear or branched $C_8$-$C_{18}$ alkyl, $C_8$-$C_{18}$ heteroaryl unsubstituted or substituted with linear or branched $C_1$-$C_5$alkyl or linear or branched $C_8$-$C_{18}$ alkyl, linear or branched $C_8$-$C_{18}$ alkyl, or linear or branched $C_8$-$C_{18}$ alkenyl. More preferably, $R_1$ and $R_2$ may be hydrogen, and $R_3$ may be $C_8$-$C_{18}$ aryl or heteroaryl substituted with linear or branched $C_1$-$C_5$alkyl or linear or branched $C_8$-$C_{18}$ alkyl, linear or branched $C_8$-$C_{18}$ alkyl, or linear or branched $C_8$-$C_{18}$ alkenyl.

Most preferably, in one embodiment of the present application, the compound represented by Formula 1 may be 2-amino-1-methyl-1-propanol, n-hexylamine, hexylamine, cyclohexylamine, n-octylamine, octylamine, dodecylamine, oleylamine, benzylamine, 1-dimethylamino-2-propanol, 2-(diethylamino)ethanol, or diphenylamine. That is, the lone pair of nitrogen contained in Formula 1 above may be coordinated to nitrogen to form the polar portion.

In one embodiment of the present application, the number of moles of the compound represented by Formula 1 that coordinates with the nickel precursor may be 2 to 6 times, preferably 4 times the number of moles of the nickel precursor. That is, the nickel precursor and the compound represented by Formula 1 may coordinate with each other to form the polar portion. If the number of moles of the compound represented by Formula 1 is less than 2 times the number of moles of the nickel precursor, a problem may arise in that the polar portion is not formed, and if the number of moles of the compound represented by Formula 1 is more than 6 times, a problem may arise in that, due to the compound represented by Formula 1, which remains without forming a complex, many bubbles may be generated during subsequent binder removal treatment, which may cause voids in the thin film of the internal electrode, reducing conductivity.

Next, in one embodiment of the present application, the method for preparing a transparent nickel complex ink composition comprises a step of mixing the nickel complex with a solvent.

In one embodiment of the present application, the content of the mixed solvent may be 12 wt % to 86 wt %, preferably 20 wt % to 82 wt %, based on the total weight of the transparent nickel complex ink composition. If the content of the solvent is less than 12 wt %, the dispersion stability of the prepared transparent nickel complex ink composition may decrease, and if the content of the solvent is more than 86 wt %, the content of the solvent is excessively high compared to the nickel complex, making it difficult to form a uniform thin film of a nickel internal electrode by applying the composition to a substrate. Meanwhile, since the specific type of solvent has been described above with respect to the first aspect of the present application, description thereof will be omitted in the third aspect of the present invention.

Next, in one embodiment of the present application, the method for preparing a transparent nickel complex ink composition for forming a thin film comprises a step of heating the nickel complex mixed with the solvent.

In one embodiment of the present application, the heating may be performed below 115° C., whereby the hydrate contained in the nickel precursor may be removed by evaporation.

In one embodiment of the present application, the step of heating the nickel complex compound mixed with the solvent may comprise a step of heating the binder resin together with the mixture.

In one embodiment of the present application, the transparent nickel complex ink composition may have an absorbance (ABS) of 1.0 or higher in a wavelength range of 600 nm to 650 nm. The reason why the nickel complex ink composition is observed to have a high absorbance (ABS) peak in a wavelength range of 600 nm to 650 nm may be that, when the lone pair of nitrogen contained in Formula 1 above coordinates with nickel to form the polar portion, an energy level difference between the d orbitals of nickel occurs, and as a result, the d-orbital electrons at the low energy level of nickel absorb light at a specific wavelength in a wavelength range of 600 nm to 650 nm and move to the d orbital at the high energy level. Meanwhile, the absorbance (ABS) value may mean a value when the concentration of the polar portion is 8 wt % to 72 wt % based on the total weight of the transparent nickel complex ink composition.

Hereinafter, examples of the present invention will be described in detail so that the present invention can be easily carried out by those skilled in the art to which the present invention pertains. However, the present invention may be embodied in various different forms and is not limited to the embodiments described herein.

Example 1: Fabrication of Nickel Internal Electrode

Step 1: Preparation of Transparent Nickel Complex Ink Composition

Nickel acetate and benzylamine were mixed together at a molar ratio of 1:4 to form a nickel polar portion. 73.6 wt % of diacetone alcohol as a solvent was mixed with 21.4 wt % of the polar portion, and 5 wt % of PVB as a binder was mixed with the transparent nickel complex ink. The resulting mixture was stirred at 100° C., thus preparing a transparent nickel complex ink composition.

Step 2: Fabrication of Nickel Internal Electrode

The transparent nickel complex ink composition prepared in step 1 was doctor-blade-printed on glass by using a 30 μm applicator and dried at 600° C., thus fabricating a nickel internal electrode.

Example 2: Fabrication of Nickel Internal Electrode

A nickel internal electrode was fabricated in the same manner as in Example 1, except that, in step 1 of Example 1, nickel acetate and cyclohexylamine were mixed at a molar ratio of 1:4 to form a nickel polar portion, and 74.4 wt % of diacetone alcohol as a solvent was mixed with 20.6 wt % of the polar portion.

Example 3: Fabrication of Nickel Internal Electrode

A nickel internal electrode was fabricated in the same manner as in Example 1, except that, in step 1 of Example 1, nickel acetate and n-octylamine were mixed at a molar ratio of 1:4 to form a nickel polar portion, and 71.5 wt % of diacetone alcohol as a solvent was mixed with 23.5 wt % of the polar portion.

Example 4: Fabrication of Nickel Internal Electrode

A nickel internal electrode was fabricated in the same manner as in Example 1, except that, in step 1 of Example 1, nickel acetate and n-octylamine were mixed at a molar ratio of 1:4 to form a nickel polar portion, and 81.6 wt % of diacetone alcohol as a solvent was mixed with 13.4 wt % of the polar portion.

Comparative Example 1: Fabrication of Nickel Internal Electrode

Step 1: Preparation of Transparent Nickel Complex Ink Composition

Nickel acetate and ethylenediamine were mixed together at a molar ratio of 1:2 to form a nickel polar portion. 82.0 wt % of diacetone alcohol as a solvent was mixed with 13.0 wt % of the polar portion, and 5 wt % of PVB as a binder was mixed with the transparent nickel complex ink. The resulting mixture was allowed to react at 100° C., thus preparing a transparent nickel complex ink composition.

Step 2: Fabrication of Nickel Internal Electrode

The transparent nickel complex ink composition prepared in step 1 was doctor-blade-printed on glass by using a 30 μm applicator and dried at 600° C., thus fabricating a nickel internal electrode.

Comparative Example 2: Fabrication of Nickel Internal Electrode

A nickel internal electrode was fabricated in the same manner as in Comparative Example 1, except that, in step 1 of Comparative Example 1, nickel acetate and n-octylamine were mixed at a molar ratio of 1:4 to form a nickel polar portion, and 87.8 wt % of diacetone alcohol as a solvent was mixed with 7.2 wt % of the polar portion.

Comparative Example 3: Fabrication of Nickel Internal Electrode

A nickel internal electrode was fabricated in the same manner as in Comparative Example 1, except that, in step 1 of Comparative Example 1, nickel acetate and n-octylamine were mixed at a molar ratio of 1:4 to form a nickel polar portion, and 91.3 wt % of diacetone alcohol as a solvent was mixed with 3.7 wt % of the polar portion.

Experimental Example 1. Comparison of Appearances of Transparent Nickel Complex Ink Compositions for MLCC Internal Electrodes Experimental Example 1-1. Comparison of Appearance Depending on Type of Ammonium Ligand In order to compare the appearance of the transparent nickel complex ink composition depending on the type of ammonium ligand, photographs of the transparent nickel complex ink compositions prepared in step 1 of Examples 1 to 3 and the transparent nickel complex compound prepared in step 1 of Comparative Example 1 are shown in FIG. 1A. First, as shown in FIG. 1A, it could be found that the transparent nickel complex ink compositions prepared in step 1 of Examples 1 to 3 of the present invention were transparent and no precipitate was formed therein, indicating that these compositions were in a particle-free state without nickel particles.

In addition, it could be found that the transparent nickel complex compound ink composition prepared in step 1 of Comparative Example 1 was transparent and no precipitate was formed therein, indicating that the composition was in a particle-free state without nickel particles. Thereby, it could be seen that the transparent nickel complex ink compositions had only different colors depending on the type of ammonium ligand, and were transparent regardless of whether they contained the monodentate ammonium ligand or the bidentate ammonium ligand, and no precipitate was formed therein, suggesting that these compositions were in a particle-free state without nickel particles.

Figure 1B:
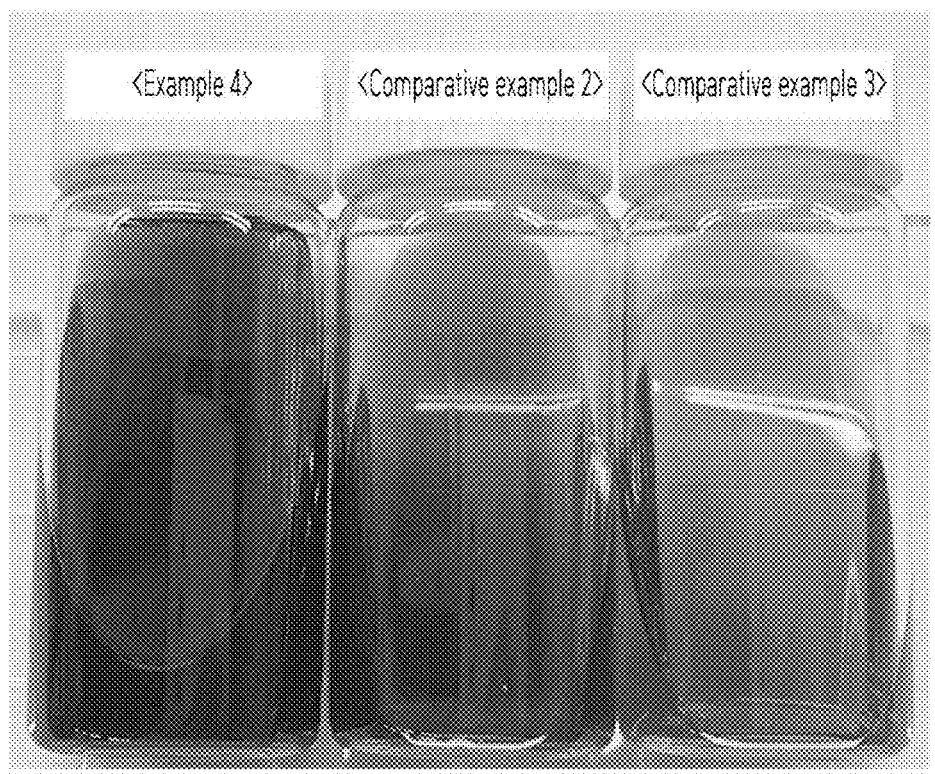

Experimental Example 1-2. Comparison of Appearance Depending on Concentration of Polar Portion It could be found that, in the case of the transparent nickel complex ink composition prepared in step 1 of Example 3, shown in FIG. 1A, the transparent nickel complex ink composition prepared in step 1 of Example 4, shown in FIG. 1B, and the transparent nickel complex ink compositions prepared in step 1 of Comparative Examples 2 to 3, shown in FIG. 1B, the concentration of the transparent nickel complex ink composition became thinner as the content of the polar portion decreased and as the content of the solvent increased.

Figure 2A:
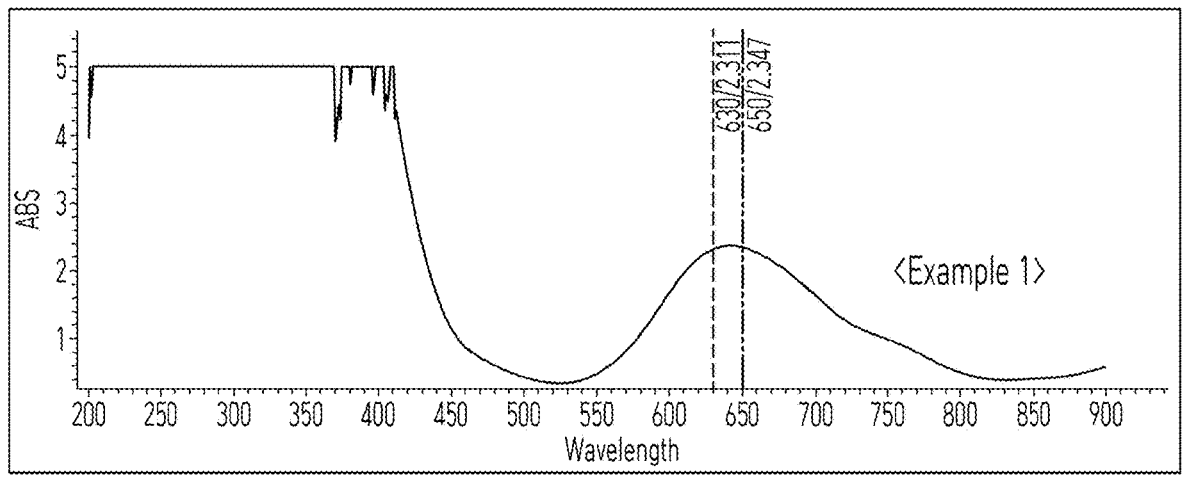
FIGS. 2A to 2G depict photographs showing the absorbances of the transparent nickel complex ink compositions prepared according to examples of the present invention and comparative examples.
Figure 2B:
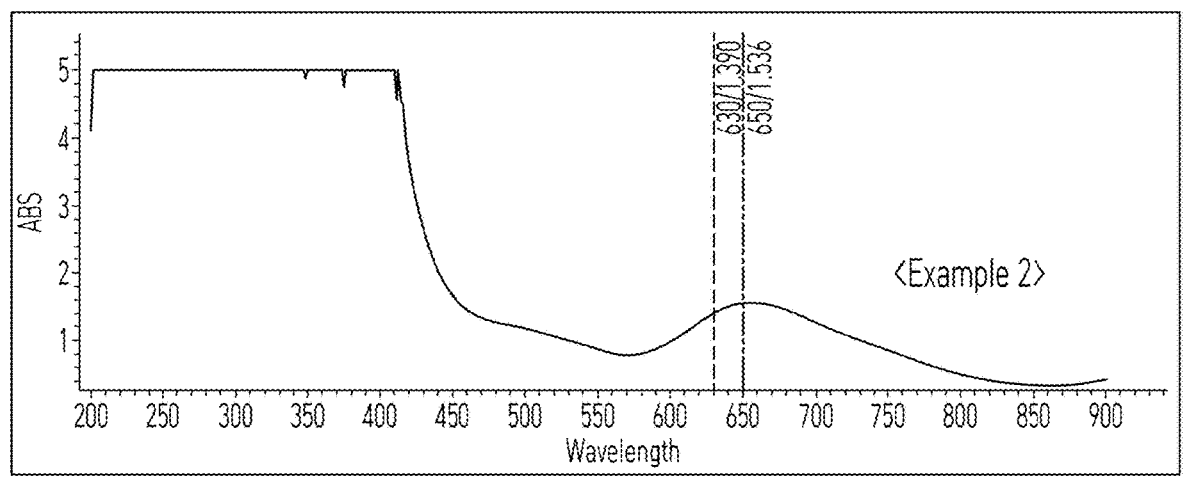
Figure 2C:
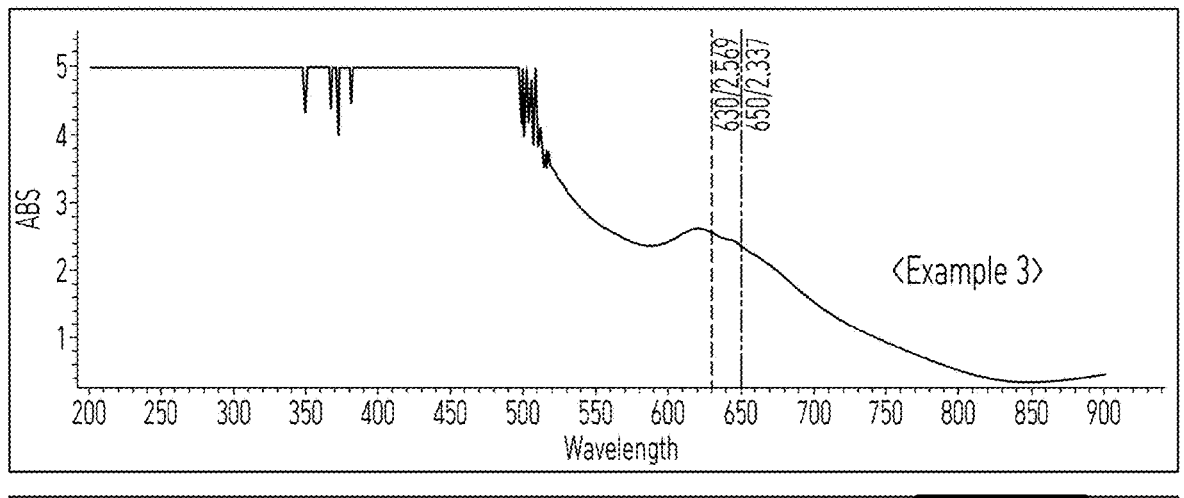
Figure 2D:
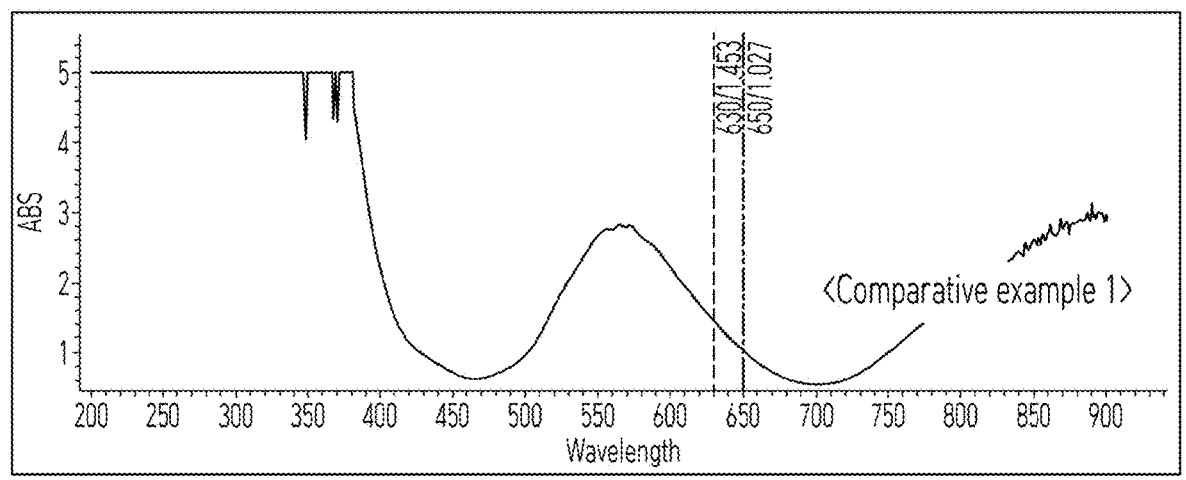

Experimental Example 2. Measurement of Absorbance of Transparent Nickel Complex Ink Composition Experimental Example 2-1. Comparison of Absorbance Depending on Type of Ammonium Ligand The BioMate 160 spectrophotometer (Thermo Scientific) was used to measure the absorbances of the transparent nickel complex ink compositions prepared in step 1 of Examples 1 to 3 and the transparent nickel complex ink composition prepared in step 1 of Comparative Example 1. The absorbances in a wavelength range of 200 nm to 900 nm were measured using the BioMate 160 spectrophotometer (Thermo Scientific), and the results are shown in FIGS. 2A to 2C and 2D, respectively. FIGS. 2A to 2C are graphs showing the absorbances of the transparent nickel complex ink composition prepared in step 1 of Examples 1 to 3, and FIG. 2D is a graph showing the absorbance of the transparent nickel complex ink composition prepared in step 1 of Comparative Example 1.

As shown in FIGS. 2A to 2C, it could be found that the transparent nickel complex ink compositions prepared in step 1 of Examples 1 to 3 had absorbance in a wavelength range of about 600 nm to 750 nm. Specifically, it could be found that the ink compositions had an absorbance (ABS) value of 1.5 or higher a wavelength of 650 nm. On the other hand, it could be found that the transparent nickel complex ink composition prepared in step 1 of Comparative Example 1, shown in FIG. 2D had absorbance in a wavelength range of 500 nm to 650 nm, unlike the transparent nickel complex ink compositions prepared in step 1 of Examples 1 to 3, shown in FIGS. 2A to 2C. Specifically, it could be found that the transparent nickel complex ink compositions prepared in step 1 of Examples 1 to 3 had absorbance (ABS) values of 2.3 or higher, 1.5 or higher, and 2.3 or higher, respectively, at a wavelength of 650 nm, and the transparent nickel complex ink composition prepared in step 1 of Example 1 had an absorbance (ABS) value of 1.0 or higher at a wavelength of 650 nm.

That is, as confirmed in Experimental Example 1-1, it could be found that the transparent nickel complex ink composition containing the monodentate ammonium ligand among ammonium ligands had an absorbance value of 1 or higher at a wavelength of 650 nm.

Figure 2E:
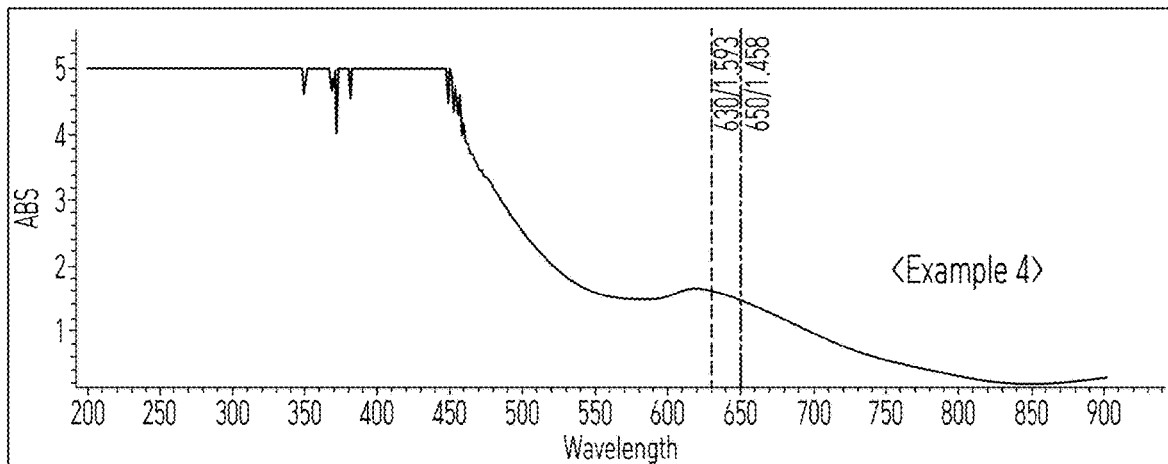
Figure 2F:
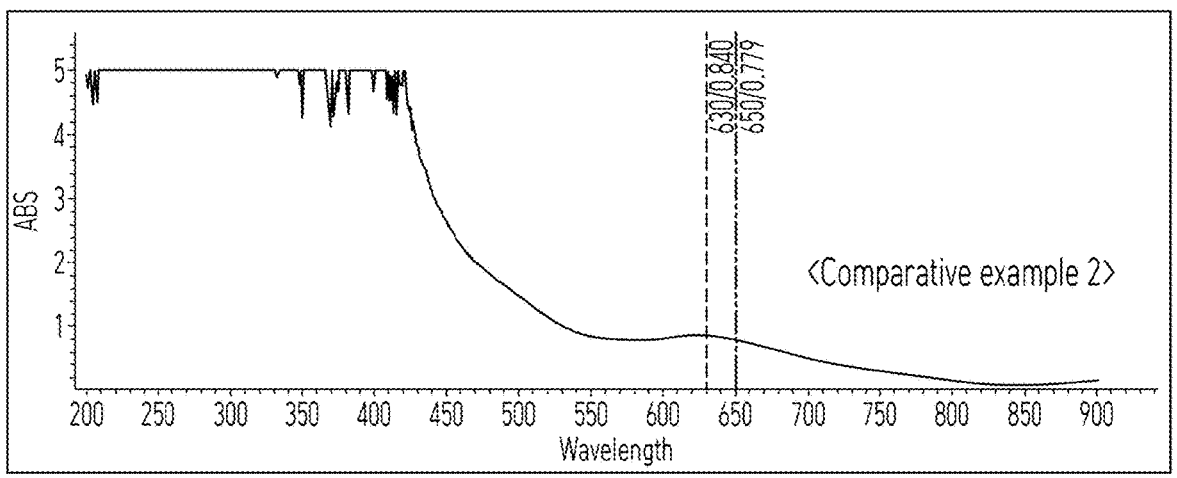
Figure 2G:
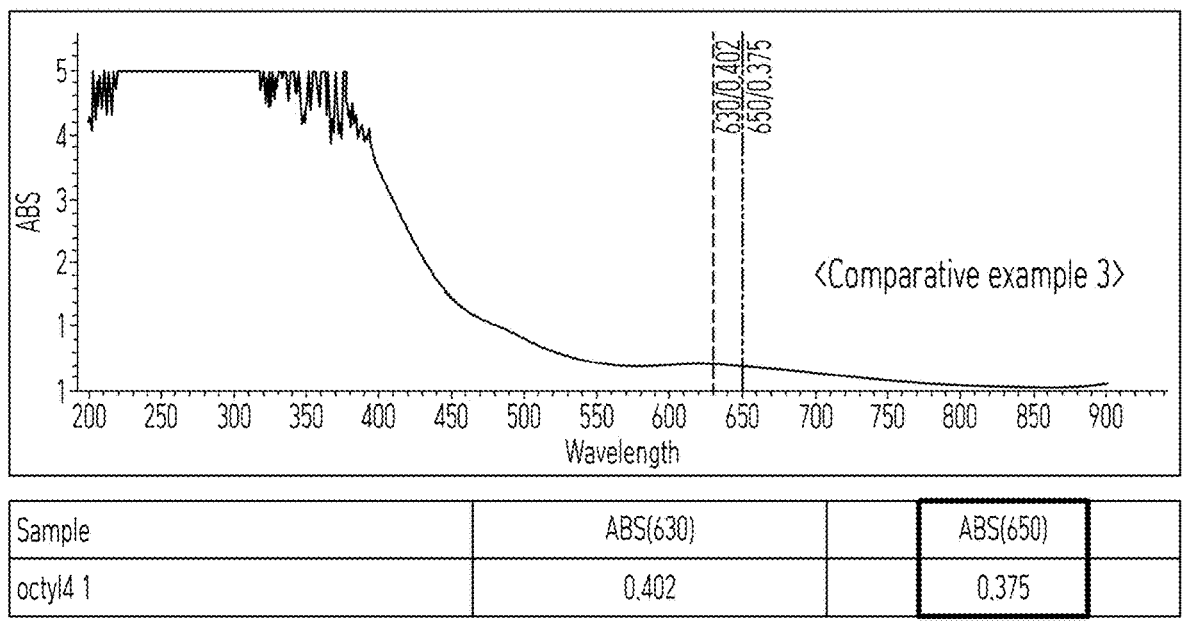

Experimental Example 2-2. Comparison of Absorbance Depending on Concentration of Polar Portion The BioMate 160 spectrophotometer (Thermo Scientific) was used to measure the absorbances of the transparent nickel complex ink compositions prepared in step 1 of Examples 3 to 4 and the transparent nickel complex ink compositions prepared in step 1 of Comparative Examples 2 and 3. The absorbances in a wavelength range of 200 nm to 900 nm were measured using the BioMate 160 spectrophotometer (Thermo Scientific), and the results are shown in FIGS. 2E, 2F and 2G, respectively. FIG. 2C is a graph showing the absorbance of the transparent nickel complex ink composition prepared in step 1 of Example 3, FIG. 2E is a graph showing the absorbance of the transparent nickel complex ink composition prepared in step 1 of Example 4, and FIGS. 2F and 2G are graphs showing the absorbances of the transparent nickel complex ink composition prepared in step 1 of Comparative Examples 2 and 3, respectively.

As shown in FIG. 2C, it could be found that the transparent nickel complex ink composition prepared in step 1 of Example 3 had absorbance in a wavelength range of about 600 nm to 750 nm. Specifically, it could be found that the ink composition had an absorbance (ABS) value of 2.3 or higher at a wavelength of 650 nm. In addition, it could be found that the transparent nickel complex ink composition prepared in step 1 of Example 4, shown in FIG. 2E, and the transparent nickel complex ink compositions prepared in step 1 of Comparative Examples 2 and 3, shown in FIGS. 2F and 2G, had absorbance in a wavelength range of 600 nm to 750 nm, like the transparent nickel complex ink composition prepared in step 1 of Example 3, shown in FIG. 2C. On the other hand, specifically, it could be found that the transparent nickel complex ink composition prepared in step 1 of Example 4 had an absorbance (ABS) value of 1.4 or higher at a wavelength of 650 nm, and the transparent nickel complex ink compositions prepared in step 1 of Comparative Examples 2 to 3 had an absorbance (ABS) value of 0.7 or higher and 0.3 or higher, respectively, at a wavelength of 650 nm.

That is, as confirmed in Experimental Example 1-2 above, it could be found through the absorbance (ABS) values that the concentration of the transparent nickel complex ink composition became thinner as the content of the polar portion decreased and as the content of the solvent increased.

Experimental Example 3. Observation of Nickel Internal Electrode

Figure 3A:
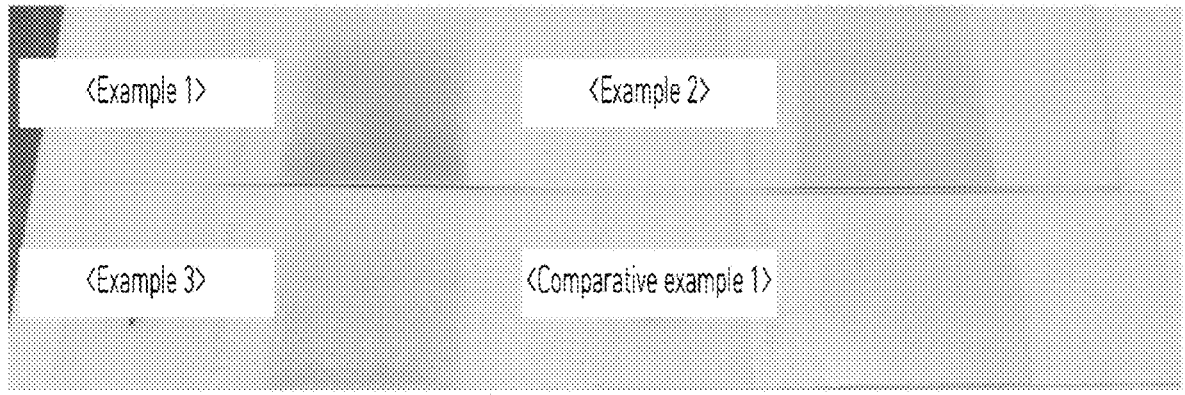
FIGS. 3A to 3B depict photographs showing thin films of nickel internal electrodes fabricated according to examples of the present invention and comparative examples.

Experimental Example 3-1. Comparison of Nickel Internal Electrodes Depending on Type of Ammonium Ligand FIG. 3A depicts photographs of the nickel internal electrodes fabricated in step 2 of Examples 1 to 3 and the nickel internal electrode fabricated in step 2 of Comparative Example 1. In addition, in order to image thin-layer morphologies of the nickel internal electrodes fabricated in step 2 of Examples 1 to 3 and the nickel internal electrode prepared in step 2 of Comparative Example 1, these nickel internal electrodes were imaged by SEM, and the results are shown in FIGS. 4A to 4D, respectively.

Figure 4A:
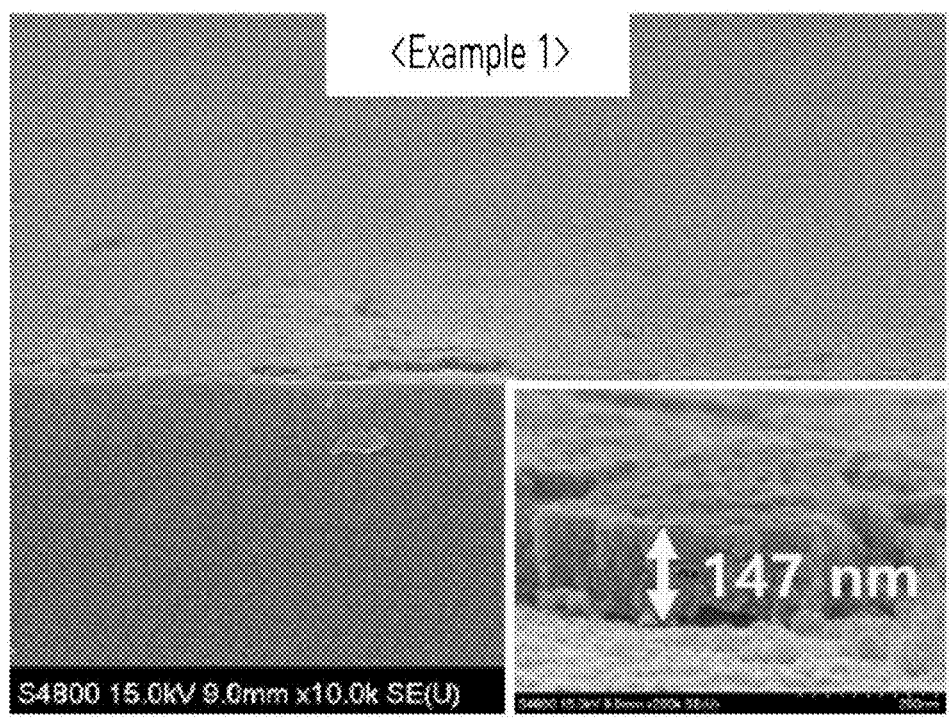
FIGS. 4A to 4G depict SEM images showing thin films of nickel internal electrodes fabricated according to examples of the present invention and comparative examples.
Figure 4B:
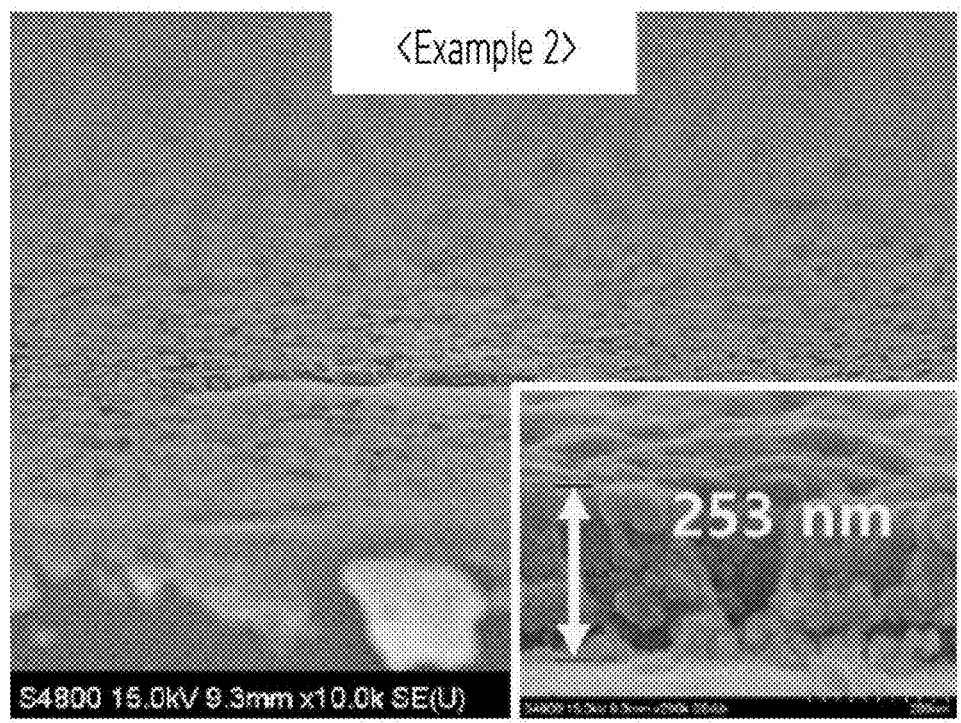
Figure 4C:
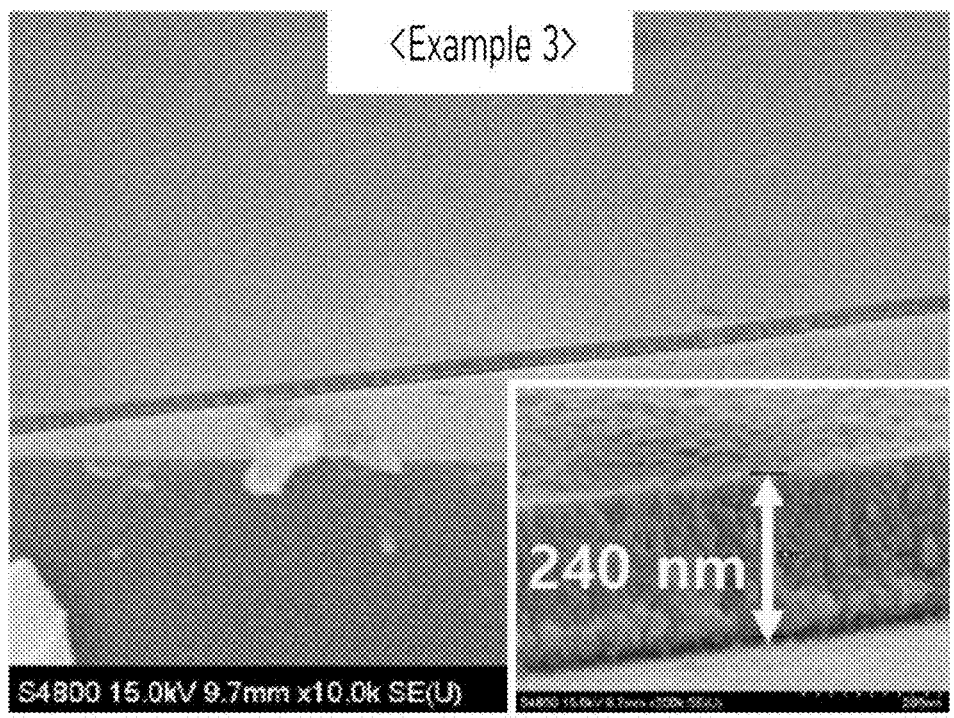
Figure 4D:
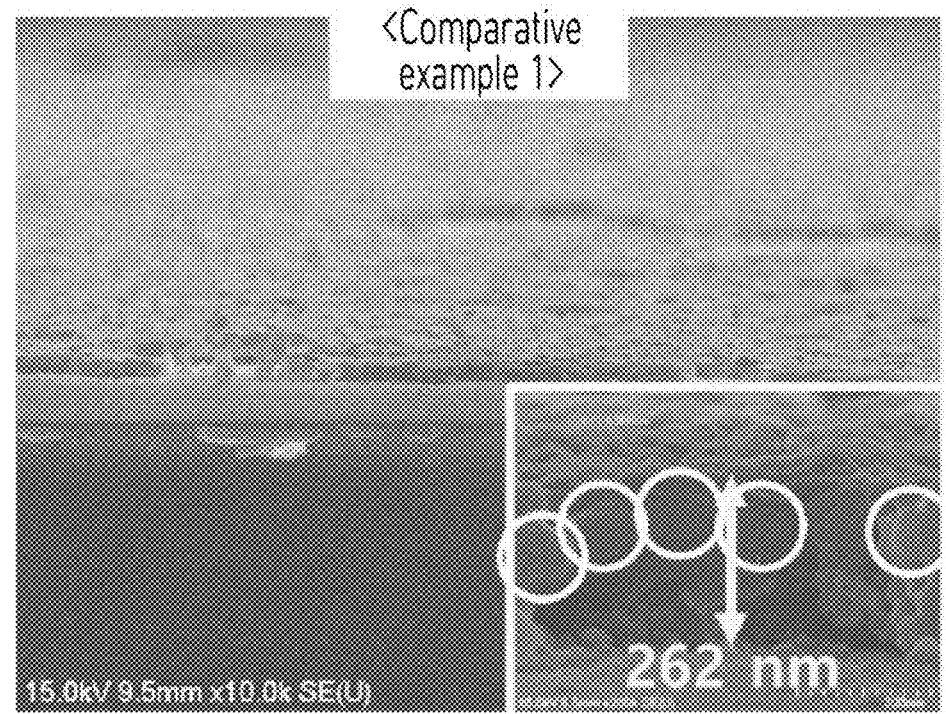

As shown in FIG. 3A, in the case of the nickel internal electrodes fabricated in step 2 of Examples 1 to 3 and the nickel internal electrode fabricated in step 2 of Comparative Example 1, there was no difference when viewed with the naked eye, regardless of whether the nickel internal electrodes were fabricated using the monodentate ammonium ligand or fabricated using the bidentate ammonium ligand. However, as shown in FIGS. 4A to 4D, it could be found that the maximum diameter of nickel particles in the thin film of the nickel internal electrode fabricated in Comparative Example 1 using the bidentate ammonium ligand was greater than the maximum diameter of nickel particles in the thin film of the nickel internal electrode fabricated in step 2 of each of Examples 1 to 3 using the monodentate ammonium ligand. In particular, it could be found that the nickel particles in the thin film of the nickel internal electrode fabricated in step 2 of Example 3 using n-octylamine, a monodentate ammonium ligand, had a very small average diameter as shown in FIG. 4C, whereas the maximum diameter of nickel particles in the thin film of the nickel internal electrode fabricated in step 2 of Comparative Example 1 using ethylenediamine, a bidentate ammonium, was close to 150 nm ligand as shown in FIG. 4D. Thereby, it could be confirmed that the nickel internal electrode fabricated in step 2 of Example 3 had lower roughness than the nickel internal electrode fabricated in step 2 of Comparative Example 1.

This lower roughness may lead to the advantage of high adhesion or tightness in the process of laminating MLCC internal electrode layers and dielectric green sheets so as to overlap each other alternately and pressing the laminate. Thus, it is possible to increase the number of thin films in the same volume of the MLCC, thereby improving performance.

Figure 3B:
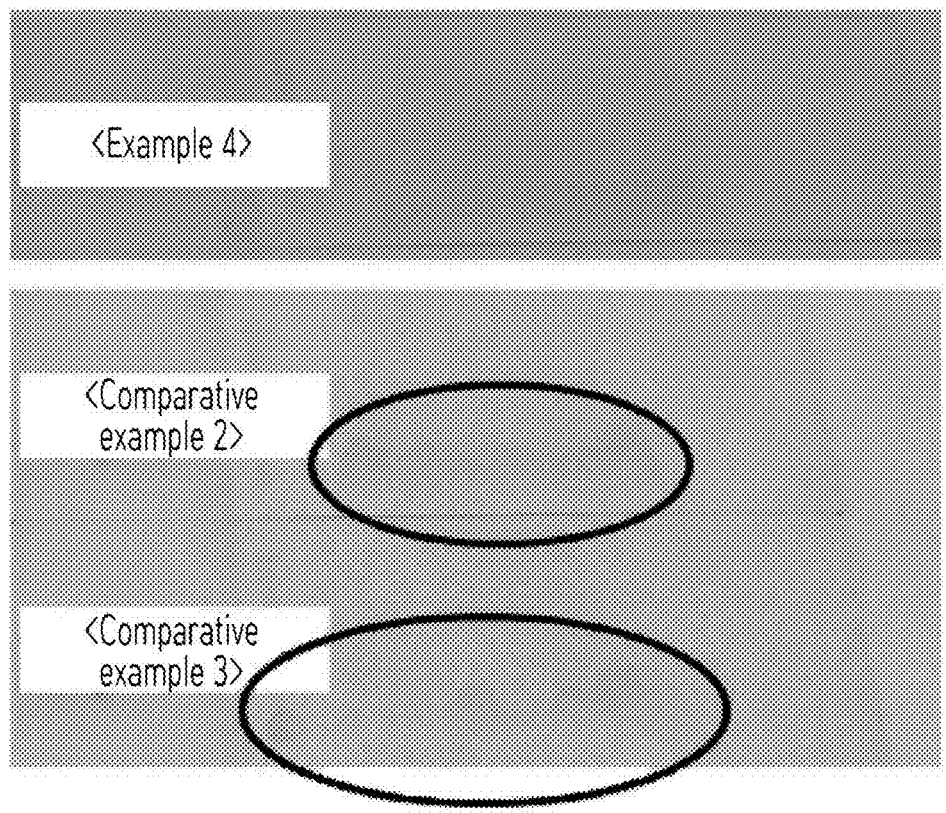

Experimental Example 3-2. Comparison of Nickel Internal Electrodes Depending on Concentration of Polar Portion FIG. 3B shows photographs of the nickel internal electrode fabricated in step 2 of Example 4 and the nickel internal electrodes fabricated in step 2 of Comparative Examples 2 and 3. In addition, to observe thin-film morphologies of the nickel internal electrode fabricated in step 2 of Example 4 and the nickel internal electrodes fabricated in step 2 of Comparative Examples 2 and 3, the nickel internal electrodes were imaged by SEM, and the results are shown in FIGS. 4E to 4G, respectively.

Figure 4E:
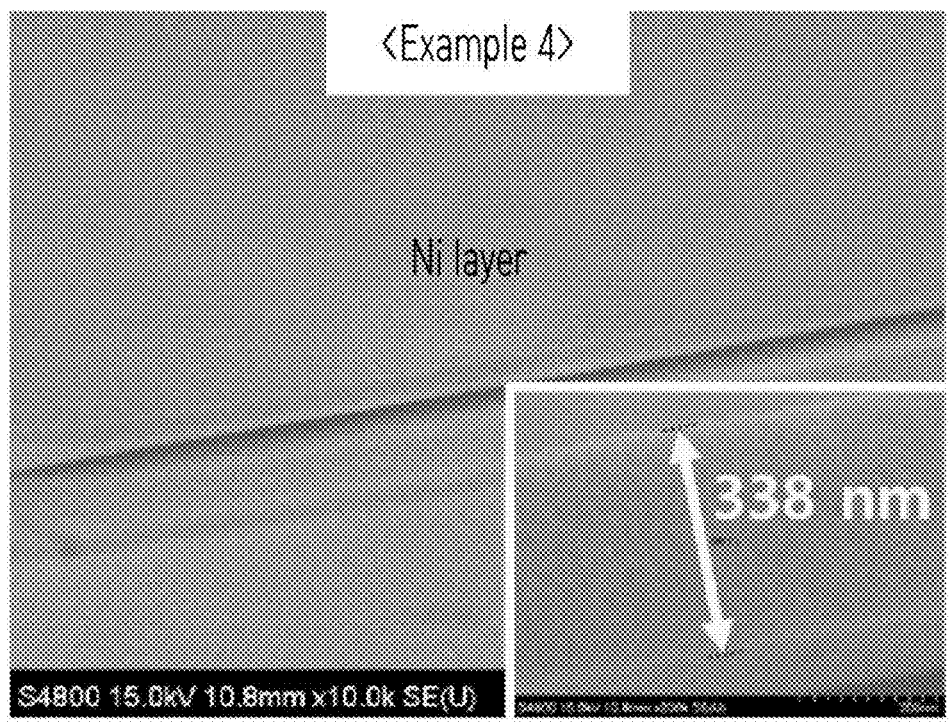
Figure 4F:
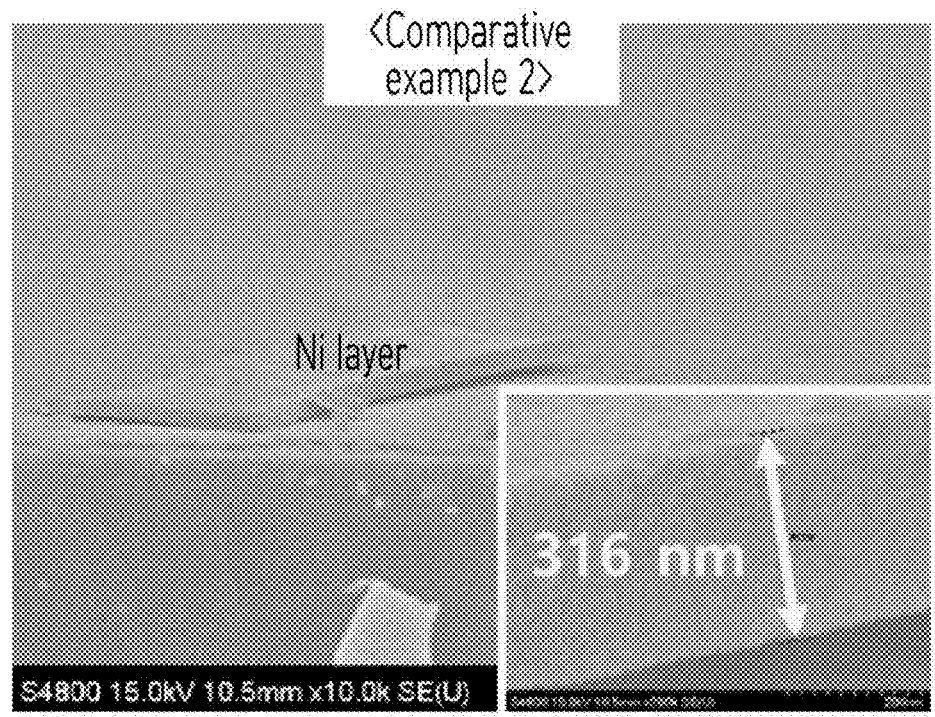
Figure 4G:
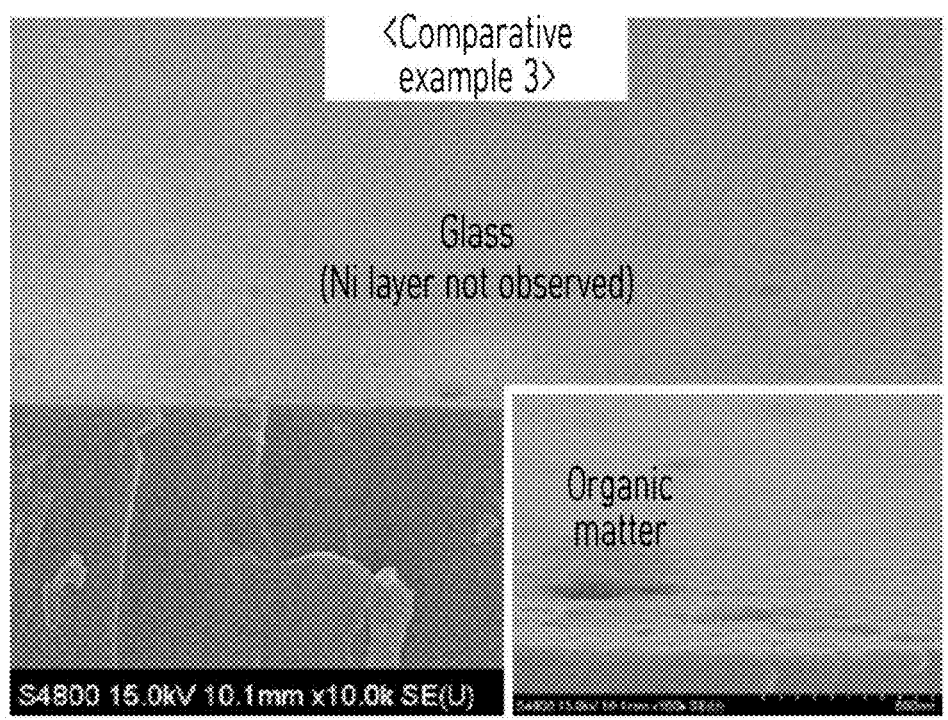

It could be found that, in the case of the nickel internal electrode fabricated in step 2 of Comparative Examples 2 and 3, a uniform thin film was not formed and the particles were clumped together, unlike the case of the nickel internal electrode fabricated in step 2 of Example 4 as shown in FIG. 4E. Specifically, it could be found that, in the case of the nickel internal electrode fabricated in step 2 of Example 4 as shown in FIG. 4E, a uniform thin film was formed, whereas the thin film of the nickel internal electrode fabricated in step 2 of Comparative Example 2, shown in FIG. 4F, was broken, and in the case of the nickel internal electrode fabricated in step 2 of Comparative Example 3, shown in FIG. 4G, not thin film was observed. This means that as the content of the polar part decreases and the content of the solvent increases, it may become difficult to form a uniform thin film.

The invention claimed is:

1. A nickel complex ink composition comprising:
a polar portion comprising nickel and a compound represented by Formula 1 below, the compound being coordinated to the nickel;
a solvent; and
at least one additive,
wherein the nickel complex ink composition is transparent and particle-free, and has an absorbance (ABS) value of 1.0 or higher in a wavelength range of 600 nm to 650 nm:

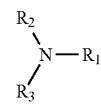

[Formula 1]

wherein R1 to R3 are each independently hydrogen, linear or branched $C_5$-$C_{20}$ alkyl, linear or branched $C_5$-$C_{20}$ alkenyl, $C_5$-$C_{20}$ cycloalkyl, $C_6$-$C_{20}$ aryl unsubstituted or substituted with linear or branched $C_1$-$C_5$alkyl or linear or branched $C_8$-$C_{18}$ alkyl, $C_6$-$C_{20}$ heteroaryl unsubstituted or substituted with linear or branched $C_1$-$C_5$alkyl or linear or branched $C_8$-$C_{18}$ alkyl, or $C_5$-$C_{20}$ alkylcarbonyl,
wherein at least one of $R_1$ to $R_3$ is any one selected from the group consisting of $C_6$-$C_{20}$ aryl unsubstituted or substituted with linear or branched $C_1$-$C_5$ alkyl or linear or branched $C_8$-$C_{18}$ alkyl, $C_6$-$C_{20}$ heteroaryl unsubstituted or substituted with linear or branched $C_1$-$C_5$alkyl or linear or branched $C_8$-$C_{18}$ alkyl, and linear or branched $C_5$-$C_{20}$ alkyl or $C_5$-$C_{20}$ alkenyl, and
wherein a concentration of the polar portion is 13.4 wt % to 23.5 wt % based on a total weight of the nickel complex ink composition.

2. The nickel complex ink composition according to claim 1, wherein $R_1$ to $R_3$ in Formula 1 are each independently hydrogen, linear or branched $C_8$-$C_{18}$ alkyl, linear or branched $C_8$-$C_{18}$ alkenyl, $C_8$-$C_{18}$ cycloalkyl, $C_8$-$C_{18}$ aryl unsubstituted or substituted with linear or branched $C_1$-$C_5$alkyl or linear or branched $C_8$-$C_{18}$ alkyl, $C_8$-$C_{18}$ heteroaryl unsubstituted or substituted with linear or branched $C_1$-$C_5$alkyl or linear or branched $C_8$-$C_{18}$ alkyl, linear or branched $C_8$-$C_{18}$ alkyl, or linear or branched $C_8$-$C_{18}$ alkenyl.

3. The nickel complex ink composition according to claim 1, wherein $R_1$ and $R_2$ in Formula 1 are each hydrogen, and $R_3$ is $C_8$-$C_{18}$ aryl or heteroaryl substituted with linear or branched $C_1$-$C_5$ alkyl or linear or branched $C_8$-$C_{18}$ alkyl, linear or branched $C_8$-$C_{18}$ alkyl, or linear or branched $C_8$-$C_{18}$ alkenyl.

4. The nickel complex ink composition according to claim 1, wherein the compound represented by Formula 1 is 2-amino-1-methyl-1-propanol, n-hexylamine, hexylamine, cyclohexylamine, n-octylamine, octylamine, dodecylamine, oleylamine, benzylamine, 1-dimethylamino-2-propanol, 2-(diethylamino)ethanol, or diphenylamine.

5. The nickel complex ink composition according to claim 1, wherein the solvent comprises a material selected from the group consisting of terpineol, a-terpineol, dihydroterpineol, terpinyl acetate, dihydroterpinyl acetate, isobornyl acetate, isobornyl propionate, isobornyl isobutyrate, ethylene glycol, propylene glycol, butylene glycol, diethylene glycol, dipropylene glycol, dipropylene glycol monomethyl ether, ethylene glycol phenyl ether, propylene glycol phenyl ether, ethylene glycol monobutyl ether acetate, dipropylene glycol methyl ether acetate, ethanol, propanol, isopropyl alcohol, butanol, isooctyl alcohol, diacetone alcohol, 1,2-pentanediol, 1,5-pentanediol, 2-methyl-2,4-pentanediol, 3-methyl-1,5-pentanediol, and combinations thereof.

6. The nickel complex ink composition according to claim 1, wherein the at least one additive includes a material selected from the group consisting of a binder resin, a plasticizer, a stabilizer, a dispersant, a mold-release agent, a reducing agent, a surfactant, a wetting agent, a thixotropic agent, a leveling agent, and combinations thereof.

7. The nickel complex ink composition according to claim 6, wherein the binder resin comprises a material selected from the group consisting of polyvinyl butyral, ethyl cellulose, polyvinyl pyrrolidone, acryl, polyvinyl acetal, polyvinyl alcohol, polyolefins, polyurethane, polystyrene, and combinations thereof.

8. A thin film comprising the nickel complex ink composition according to claim 1, wherein a maximum diameter of nickel particles in the thin film comprising the nickel complex ink composition may be 150 nm or less, the thin film being disposed on a substrate.

9. The nickel complex ink composition according to claim 6, wherein the nickel complex ink composition is a nickel complex ink composition for forming MLCC internal electrodes, for electromagnetic wave shielding, for forming solar cell electrodes, or for forming display panel electrodes.

10. A method for preparing a transparent nickel complex ink composition, the method comprising:
preparing a nickel complex by mixing a nickel precursor and a compound represented by Formula 1 below;
mixing the nickel complex with a solvent;
heating a mixture of the nickel complex and the solvent; and
heating a binder resin together with the mixture:

[Formula 1]

wherein $R_1$ to $R_3$ are each independently hydrogen, linear or branched $C_5$-$C_{20}$ alkyl, linear or branched $C_5$-$C_{20}$ alkenyl, $C_5$-$C_{20}$ cycloalkyl, $C_6$-$C_{20}$ aryl unsubstituted or substituted with linear or branched $C_1$-$C_5$ alkyl or linear or branched $C_8$-$C_{18}$ alkyl, $C_6$-$C_{20}$ heteroaryl unsubstituted or substituted with linear or branched $C_1$-$C_5$ alkyl or linear or branched $C_8$-$C_{18}$ alkyl, or $C_5$-$C_{20}$ alkylcarbonyl, and wherein at least one of $R_1$ to $R_3$ is any one selected from the group consisting of $C_6$-$C_{20}$ aryl unsubstituted or substituted with linear or branched $C_1$-$C_5$ alkyl or linear or branched $C_8$-$C_{18}$ alkyl, $C_6$-$C_{20}$ heteroaryl unsubstituted or substituted with linear or branched $C_1$-$C_5$ alkyl or linear or branched $C_8$-$C_{18}$ alkyl, and linear or branched $C_5$-$C_{20}$ alkyl or $C_5$-$C_{20}$ alkenyl, wherein a concentration of a polar portion formed from the nickel complex after the heating of the binder resin is 13.4 wt % to 23.5 wt % based on a total weight of the nickel complex ink composition, wherein the nickel complex ink composition is transparent and particle-free, and has an absorbance (ABS) value of 1.0 or higher in a wavelength range of 600 nm to 650 nm.

11. The method according to claim 10, wherein the heating of the mixture is performed below 115° C.

* * * * *